United States Patent [19]
Sheirer

[11] Patent Number: 5,927,411
[45] Date of Patent: Jul. 27, 1999

[54] CONNECTOR WITH VARIABLE RESISTANCE RETENTION MEMBER

[75] Inventor: Daniel C. Sheirer, Bedford, Pa.

[73] Assignee: Kennametal Inc., Latrobe, Pa.

[21] Appl. No.: 08/840,821

[22] Filed: Apr. 16, 1997

[51] Int. Cl.$^6$ .......................... E21B 10/36; E21B 17/00; B23B 5/22; F16L 17/00
[52] U.S. Cl. .................. 175/417; 175/320; 175/415; 279/102; 285/344
[58] Field of Search .................. 175/320, 414, 175/415, 417; 285/344, 918; 279/102

[56] References Cited

U.S. PATENT DOCUMENTS

| | | | |
|---|---|---|---|
| 3,257,719 | 6/1966 | Larkfeldt | 279/102 |
| 3,360,285 | 12/1967 | Huckshold . | |
| 3,494,639 | 2/1970 | Smith | 279/102 |
| 3,519,091 | 7/1970 | Leibee et al. | 175/320 |
| 4,099,585 | 7/1978 | Emmerich | 175/320 |
| 4,189,013 | 2/1980 | Adams et al. | 175/320 |
| 4,190,125 | 2/1980 | Emmerich et al. | 175/410 |
| 4,484,783 | 11/1984 | Emmerich | 299/86 |
| 4,615,402 | 10/1986 | Eisenloeffel | 175/320 |
| 4,632,195 | 12/1986 | Emmerich | 175/320 |
| 4,819,748 | 4/1989 | Truscott | 175/410 |
| 5,213,347 | 5/1993 | Rulon et al. | 279/102 |
| 5,400,861 | 3/1995 | Sheirer | 175/427 |
| 5,628,549 | 5/1997 | Ritchey et al. . | |
| 5,730,502 | 3/1998 | Montgomery, Jr. . | |

FOREIGN PATENT DOCUMENTS

| | | |
|---|---|---|
| 0149207 | 7/1985 | European Pat. Off. . |
| 1397952 | 3/1965 | France . |
| 3524865 | 1/1987 | Germany . |

OTHER PUBLICATIONS

U.S. Patent Application Serial No. 08/573,220 filed Dec. 13, 1995 entitled Cutting Tool Sleeve Rotation Limitation System.
U.S. Patent Application Serial No. 08/769,405 filed Dec. 19, 1996 entitled Cutting Tool Sleeve Rotation Limitation System.
Gardner's Chemical Synonyms and Trade Names, Tenth Edition, Gower Publishing Ltd (1994) pp. 137–138.
Kennametal Mining Products Catalog B92–75R(3)M5, Kennametal Inc., Latrobe PA (36 pages).
Kennametal Mining Products Catalog A96–55(15)H6, Kennametal Inc., Latrobe PA (36 pages).

*Primary Examiner*—Terry Lee Melius
*Assistant Examiner*—Gary S. Hartmann
*Attorney, Agent, or Firm*—John J. Prizzi

[57] ABSTRACT

A rotatable cutting bit-chuck assembly wherein the cutting bit has an axially forward end an axially rearward end with at least one cutting insert at the axially forward end. The cutting bit contains a cavity defined by a cavity wall. The chuck has an axially forward end and an axially rearward end. Upon assembling the cutting bit on the chuck, the cavity of the cutting bit receives the axially forward end of the chuck wherein there is a variable resistance retention member between the chuck and the cavity wall.

31 Claims, 5 Drawing Sheets

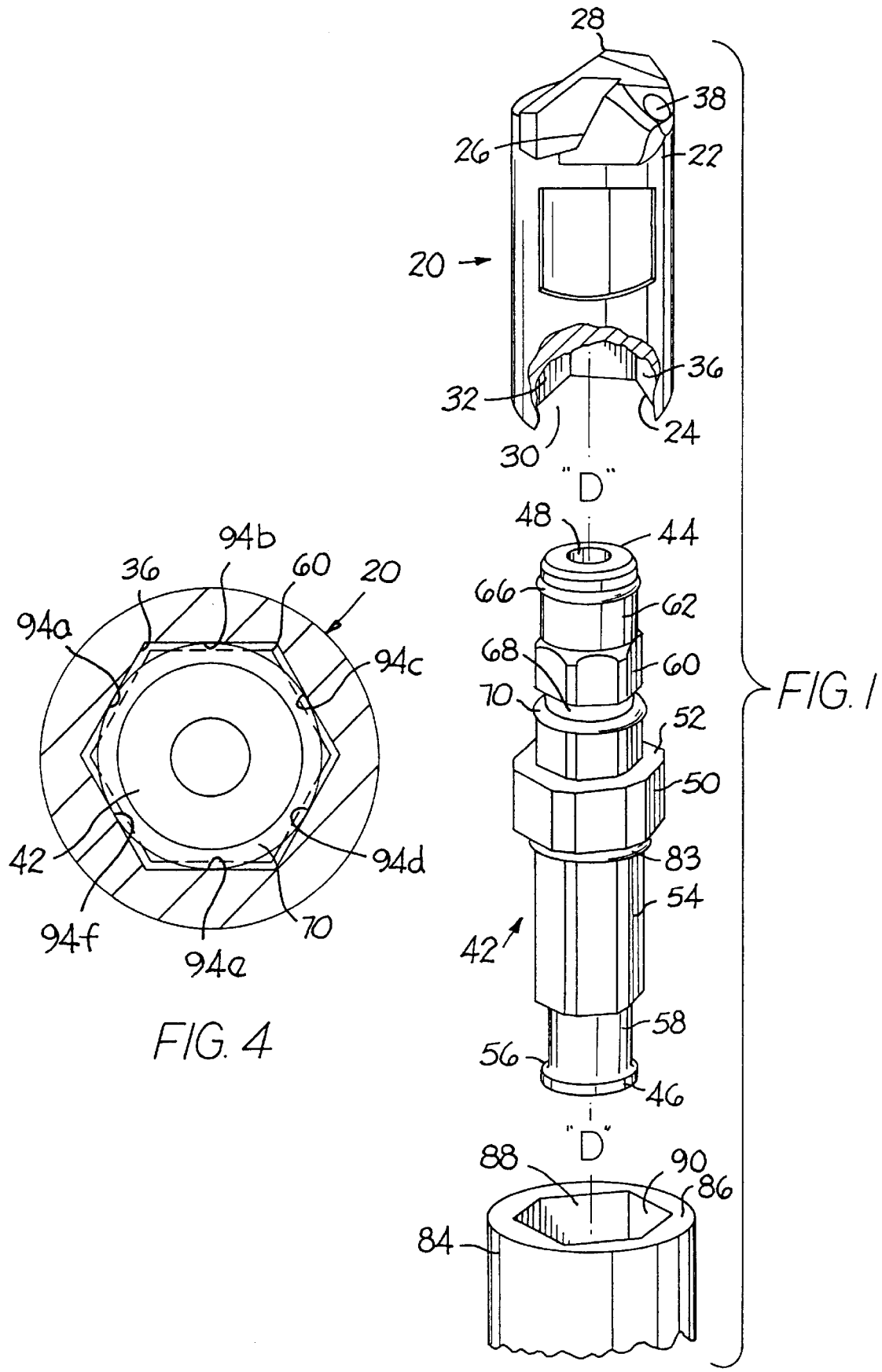

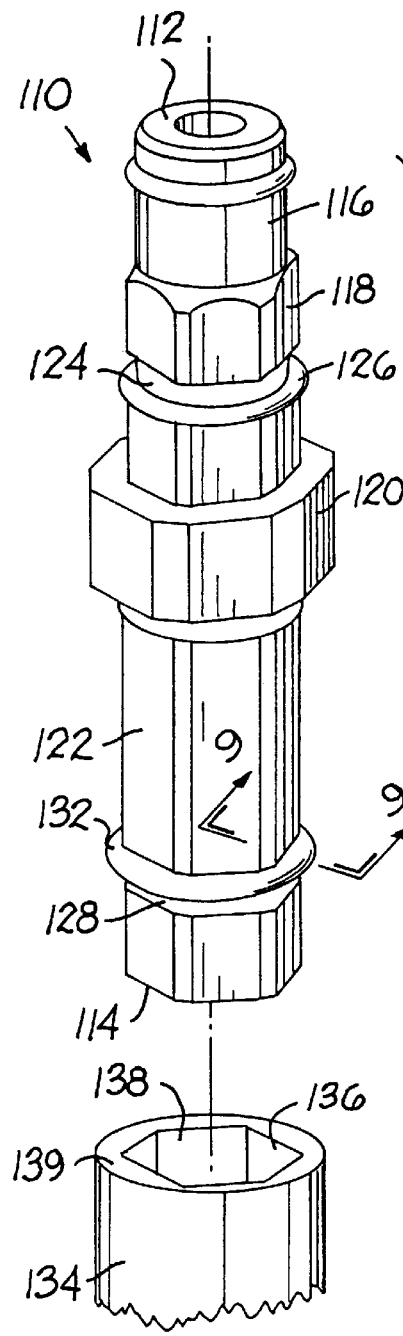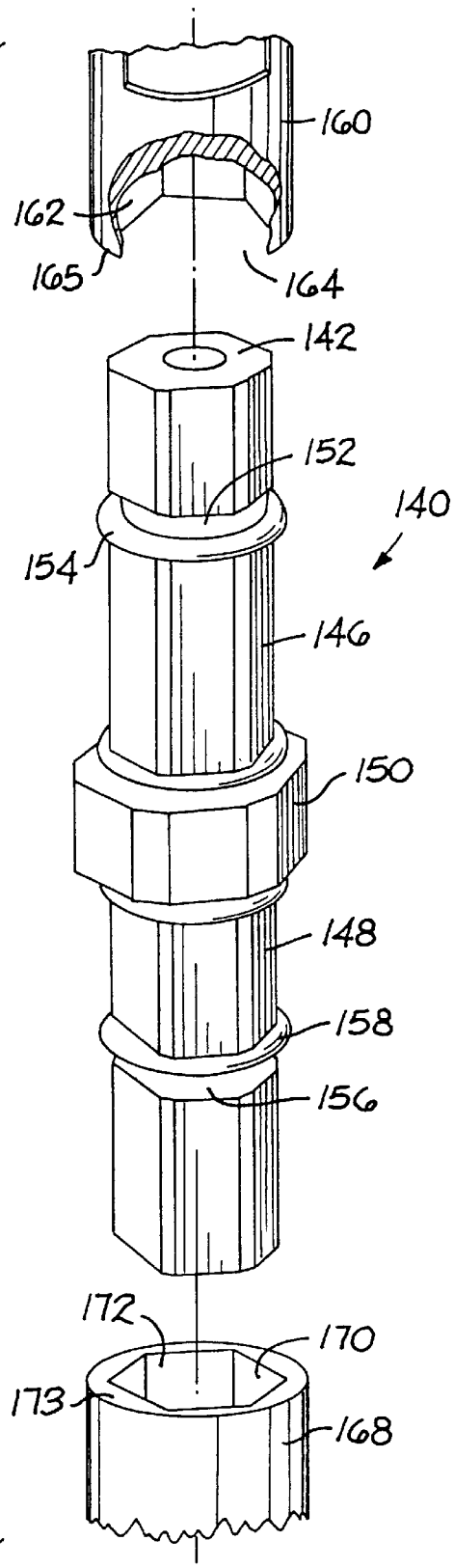

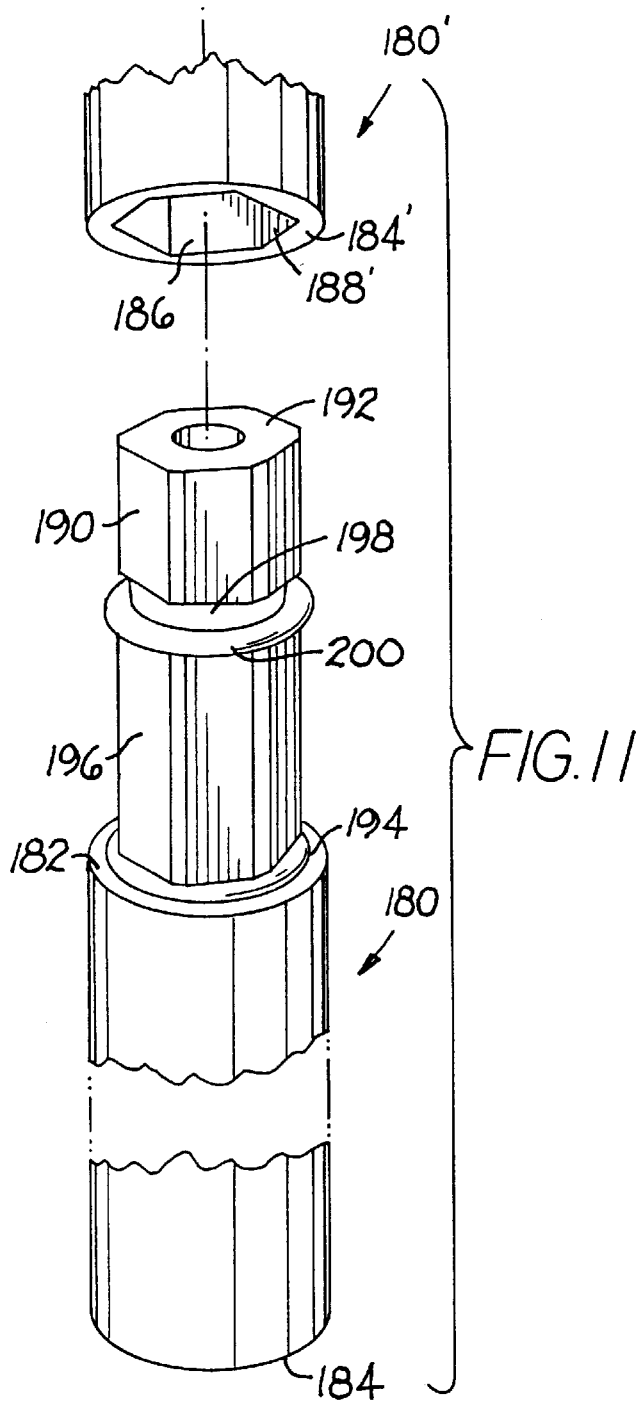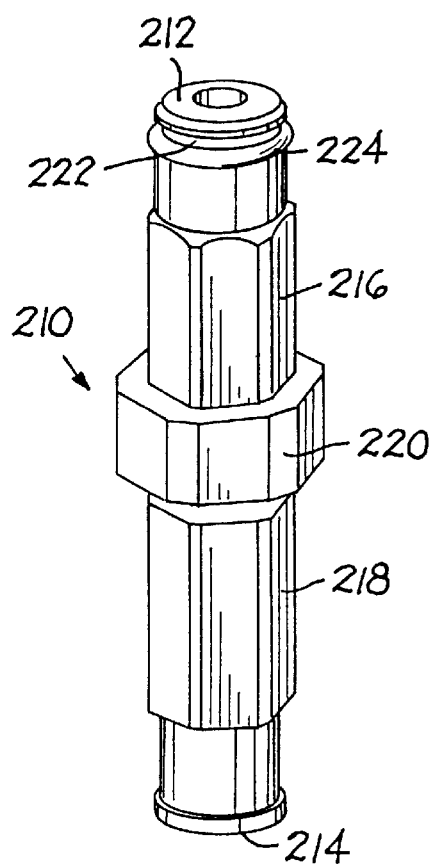

CONNECTOR WITH VARIABLE RESISTANCE RETENTION MEMBER

BACKGROUND OF THE INVENTION

The expansion of an underground mine (e.g. a coal mine) requires digging a tunnel which initially has an unsupported roof. To stabilize and support the roof, roof bolts must be inserted into the roof to provide support. The operator must first drill holes in the roof through the use of a cutting bit (or roof drill bit) which connects, either directly or by way of a chuck, to a driven drill steel. U.S. Pat. No. 5,400,861 to Sheirer, which is hereby incorporated by reference herein, discloses various roof drill bits and ways to connect the cutting bit to the chuck. See also "Kennametal Mining Products" Catalog A96-55(15) H6 (September 1996) [36 pages], and "Kennametal Mining Products" Catalog B92-75R(3)M5 (1992) [36 pages], which are hereby incorporated by reference herein.

After drilling the hole, the operator must remove the cutting bit-chuck-drill steel assembly from the hole prior to inserting the roof bolt. Sometimes during such removal, the cutting bit sticks in the hole so that continued removal results in the cutting bit becoming detached from the balance of the assembly (i.e., the chuck and the drill steel) and remaining in the hole. This is an undesirable happening which necessitates additional effort to extract the cutting bit from the hole.

Heretofore, there have been arrangements to connect the cutting bit to the chuck (or drill steel) with separate mechanical connectors (e.g., pins and clips). These earlier arrangements have experienced some drawbacks.

In order to assembly the cutting bit to the chuck, the operator had to align apertures in the chuck and the cutting bit and then position the connector (e.g., a pin) so as to engage these apertures. The use of this type of assembly to connect the cutting bit to the chuck was time-consuming if the operator had difficulty aligning the apertures. If one or both apertures had debris therein the operator experienced difficulty in passing the connector through (or into) the apertures.

These earlier mechanical connectors were exposed to the mine environment so that they were subject to damage during the drilling operation. In the event of damage to the connector, the connector sometimes did not retain the cutting bit to the balance of the assembly upon removal from the hole thereby leaving the cutting bit in the hole. Damage of the connector sometimes resulted in the operator experiencing difficulty in disassembling the cutting bit from the chuck after removal from the hole.

It thus becomes apparent that it would be desirable to provide a cutting bit-chuck assembly wherein the cutting bit would easily connect or disconnect from the chuck, preferably by hand, and yet, the connection therebetween would be sufficiently strong so as to successfully resist disconnection during removal of the cutting bit-chuck-drill steel assembly from the hole. Furthermore, it would be desirable to provide a cutting bit-chuck assembly wherein the connection between the cutting bit and the chuck would not be exposed to the mine environment so as to reduce the potential for damage thereto.

The drawbacks expressed above with respect to the connection between the cutting bit and the chuck also may exist in the chuck-drill steel assembly and the drill steel-drill steel assembly. Thus, it would be desirable to provide a chuck-drill steel assembly and a drill steel-drill steel assembly which have the above advantages as expressed above for the cutting bit-chuck assembly.

SUMMARY

In one form thereof, the invention is a rotatable cutting bit assembly which includes a cutting bit with an axially forward end and an axially rearward end and at least one cutting insert at the axially forward end of the cutting bit. The cutting bit contains a cavity, defined by a cavity wall, therein wherein the cavity has an opening at the rearward end of the cutting bit.

The assembly also has a chuck which has an axially forward end, an axially rearward end, a central longitudinal axis. Upon assembling the bit and the chuck, the axially forward end of the chuck is received within the cavity of the bit. A variable resistance retention member is between the chuck and the cavity wall.

BRIEF DESCRIPTION OF THE DRAWINGS

The following is a brief description of the drawing figures which form a part of this patent application:

FIG. 1 is an exploded isometric view of a first specific embodiment of the cutting bit, the chuck, and the drill steel wherein a portion of the cutting bit body is removed to expose the cavity and the cavity wall of the cutting bit;

FIG. 4 is a cross-sectional view of the structure of FIG. 2 taken along section line 4—4 of FIG. 2;

FIG. 8 is an isometric view of another specific embodiment of a chuck which connects together the cutting bit and the drill steel wherein the rearward portion of the chuck uses an resilient ring to connect to the drill steel;

FIG. 10 is an isometric view of a connector which uses an resilient ring in the forward portion thereof and an resilient ring in the rearward portion thereof to connect together two sections of drill steel;

FIG. 11 is an isometric view of a portion of the axially forward end of a drill steel with a connector thereat, and the axially rearward end of an adjacent drill steel wherein the adjacent drill steel presents a cavity which receives the connector; and FIG. 12 is an isometric view of another embodiment of a chuck which carries a resilient ring which provides for variable resistance retention, as well as a fluid sealing relationship, between the chuck and another member.

DETAILED DESCRIPTION

Figure 3:
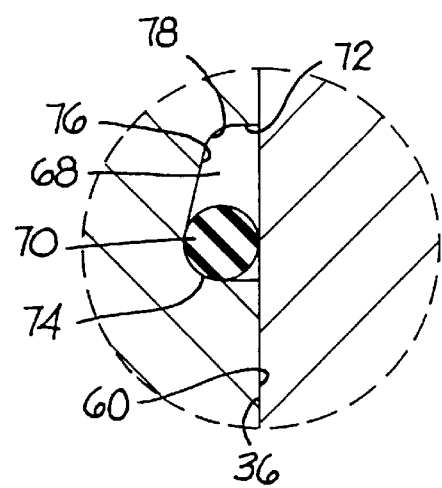
FIG. 3 is an enlarged view of the portion of the structure of FIG. 2 illustrating the position of the resilient ring in the groove when the cutting bit abuts the enlarged diameter portion of the chuck.
Figure 2:
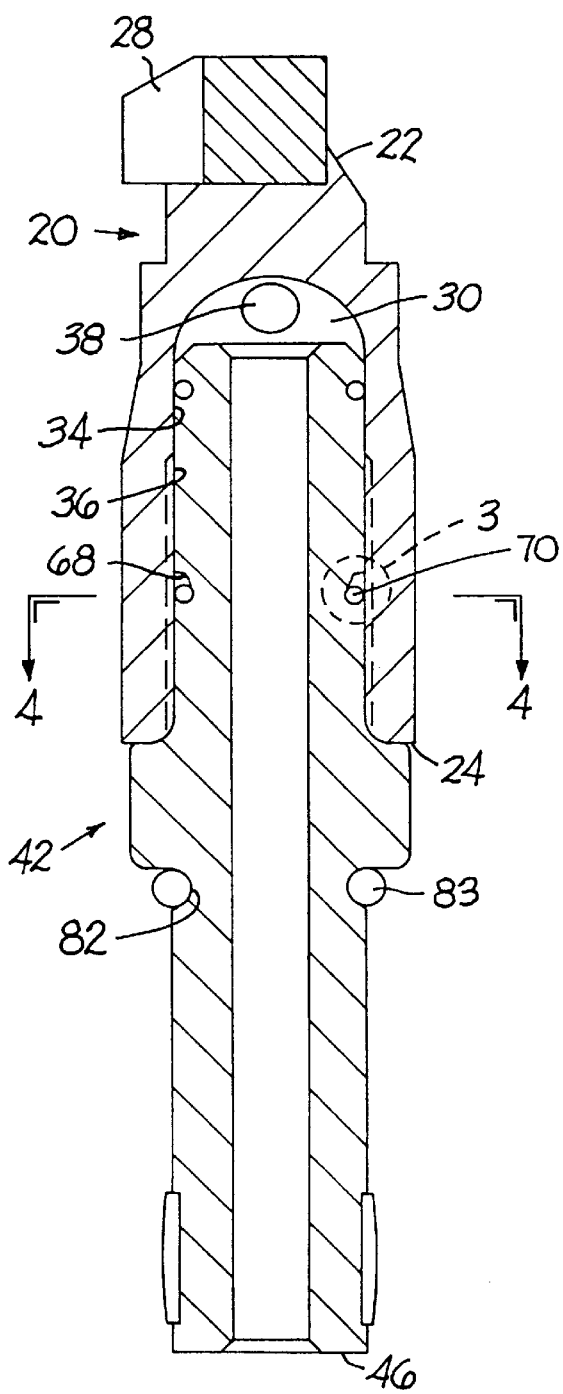
FIG. 2 is a cross-sectional view of the cutting bit and the chuck in an assembled condition wherein the cutting bit is in an axially rearward position relative to the chuck so that the rearward end of the cutting bit abuts the enlarged diameter portion of the chuck which is the typical position of the drill bit relative to the chuck during the drilling operation.

Referring to the drawings, FIGS. 1 through 6 depict a first specific embodiment of the cutting bit assembly. The cutting bit assembly includes a cutting bit, generally designated as 20, which has an axially forward end 22 and an axially rearward end 24. Cutting bit 20 contains a seat 26 in the axially forward end 22 thereof that receives a cutting insert 28. The cutting insert 28 may be of any configuration suitable for cutting earth strata, and especially for drilling holes in underground mine roofs.

Cutting bit 20 contains a cavity 30 which opens at the axially rearward end 24 thereof. A cavity wall 32 defines cavity 30. Cavity wall 32 has a cylindrical portion (not illustrated) adjacent to the axially forward end 22 of the cutting bit 20 and a hexagonal (or non-cylindrical portion) portion 36 adjacent to the axially rearward end 24 of the cutting bit 20. Cutting bit 20 further contains a passage 38 which provides communication between the cavity 30 and the axially forward end 22 of the cutting bit 20.

The cutting bit assembly further includes a chuck 42 which has an axially forward end 44 and an axially rearward end 46. Chuck 42 contains a central longitudinal bore 48. Chuck 42 further has an enlarged diameter hexagonal (or non-cylindrical) portion 50 which presents an axially forwardly facing shoulder 52. An axially rearward hexagonal (or non-cylindrical) portion 54 is axially rearward of the enlarged diameter portion 50. An axially rearward reduced diameter portion 56 is axially rearward of the hexagonal portion 54. The reduced diameter portion 56 carries a resilient keeper ring 58. Axially rearward hexagonal portion 54 contains a groove 82 which carries a seal 83.

An axially forward hexagonal (or non-cylindrical portion) portion 60 is axially forward of the enlarged diameter portion 50 of the chuck 42. An axially forward cylindrical portion 62 is axially forward of the hexagonal portion 60. As an option for wet drilling applications, the cylindrical portion 62 contains an annular groove 64 which carries a resilient seal 66 like that described in U.S. Pat. No. 5,400,861. The presence of the groove 64 and the resilient seal 66 may not be necessary for dry drilling applications. Axially forward hexagonal portion 60 contains a groove 68 which carries a resilient ring 70 which, as will become apparent from the discussion herein, functions as a variable resistance retention member so as to connect the cutting bit 20 to the chuck 42 in such a fashion so as to permit assembly or disassembly of the cutting bit on to or off of the chuck, preferably by hand, and yet provide sufficient frictional resistance so as to retain the cutting bit 20 on the chuck 42 during removal thereof from the hole.

Figure 6:
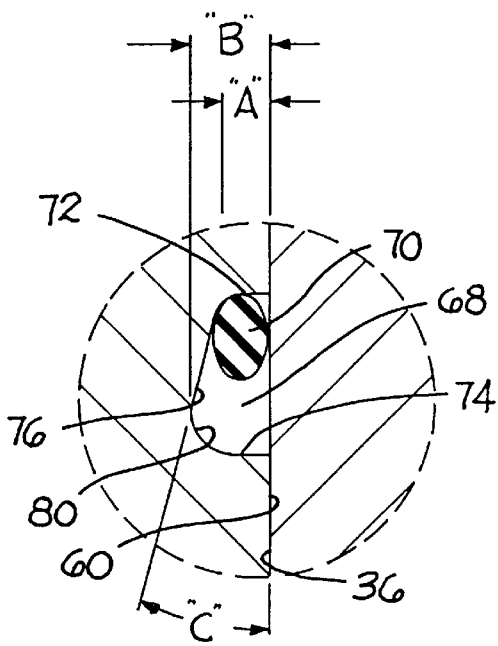
FIG. 6 is an enlarged view of the portion of the structure of FIG. 5 illustrating the position of the resilient ring in the groove when the cutting bit is retained on the chuck by the variable resistance retention member.

Referring to FIGS. 3 and 6, groove 68 includes an axially forward surface 72, an axially rearward surface 74, and an inclined bottom surface 76. The juncture of the axially forward surface 72 with the bottom surface 76 is rounded as at 78. The juncture of the axially rearward surface 74 with the bottom surface 76 is rounded as at 80. The depth "A" of the groove 68 adjacent the axially forward surface 72 is less than the depth "B" of the groove 68 adjacent the axially rearward surface 74. Inclined bottom surface 76 has a preferred included angle of disposition "C" relative to the central longitudinal axis D—D (see FIG. 1) of the chuck preferably equal to about 20 degrees. However, this angle may range between about 7 degrees to about 45 degrees depending upon the specific application, the size of the resilient ring 70, and the like.

Drill steel 84 has an axially forward end 86 which contains a cavity 88 defined by a hexagonal wall 90. The connection of the chuck 42 to the drill steel 84, as well as the seal therebetween provided by seal 83, is described in U.S. Pat. No. 5,400,861.

In operation, the resilient ring 70 functions to provide for variable frictional resistance between itself and the cavity wall 32 of the cutting bit 20. More specifically, upon the assembly of the cutting bit 20 to the chuck 42, the cavity 30 of the cutting bit 20 receives the axially forward portion of the chuck 42 comprising the axially forward cylindrical portion 62 and the axially forward hexagonal portion 60. As the cutting bit 20 moves axially rearwardly relative onto the chuck 42, the hexagonal portion 36 of the cavity wall 32 engages (i.e., frictionally engages) the resilient ring 70 so as to move the ring 70 toward the axially rearward surface 74 of the groove 68 so that the ring 70 preferably, but not necessarily, abuts against axially rearward surface 74 (see FIG. 3). The operator will typically assemble the cutting bit 20 on the chuck 42 so that the axially rearward end 24 of the cutting bit 20 abuts against the shoulder 52 of the chuck 42. This is also the position of the cutting bit 20 relative to the chuck 42 (i.e., the axially rearward end 24 of the cutting bit 20 remains in abutment against shoulder 52) during the drilling operation since these members are under compression. While in this position, the resilient ring 70 preferably rests in the rounded juncture 80 between the inclined bottom surface 76 and axially rearward surface 74 of the groove 68. The resilient ring 70 does not exert much force against the hexagonal portion 36 of the cavity wall 32 because it only slightly (or lightly) contacts the hexagonal portion 36 of the cavity wall 32. In this regard, the diameter of the resilient ring 70 when in a relaxed condition is preferably slightly larger than the depth of the groove 68 adjacent to the axially rearward surface 74 thereof. By having such a diameter, the ring 70 is in contact (even though it is slight) with the cavity wall 32 of the cutting bit 20 when resting in the rounded juncture 80, which is the position at which it exerts the least amount of pressure (or force) against the cavity wall 32.

Upon completion of the drilling operation, it then becomes necessary to remove the cutting bit-chuck-drill steel assembly from the hole. During the removal of the cutting bit-chuck-drill steel assembly from the hole the cutting bit will sometimes become stuck in the hole. When the cutting bit sticks in the hole, the continued movement of the chuck 42 (and drill steel) causes the chuck 42 to move away from (i.e., axially rearward relative to) the cutting bit 20.

Because there is some (even though it may be slight) frictional engagement between the resilient ring 70 and the hexagonal portion 36 of the cavity wall 32, the axially rearward movement of the chuck 42 relative to the cutting bit 20 causes the ring 70 to move toward the axially forward surface 72 of the groove 68. Because of the gradual decrease in the depth of the groove 68 due to the inclination of the bottom surface 76, the degree of compression between the hexagonal portion 36 of the cavity wall 32 and the bottom surface 76 of the groove 68 becomes more severe as the resilient ring 70 moves closer to the axially forward surface 72 of the groove 68. As illustrated in FIG. 6, the ring 70 has deformed under the compressive stresses to take on a distorted shape (e.g., an elliptical or oval shape). Although FIG. 6 shows the that the ring 70 abuts against the axially forward surface 72 of the groove 68, it should be appreciated that the ring 70 does not necessarily have to abut the axially forward surface 72 in order to provide a sufficiently strong connection so as to permit the operator to dislodge the stuck cutting bit.

It can thus be seen that the resilient ring 70 functions as a variable resistance retention member in that it provides for variable resistance between itself and the cavity wall 32 of the cutting bit 20 so as to frictionally retain the cutting bit 20 on the chuck 42. The degree of resistance varies between a maximum at the point where the resilient ring 70 abuts against the axially forward surface 72 of the groove 68, and a minimum when the ring 70 rests in the rounded juncture 80 of the groove 68. The position of maximum compression is shown in FIG. 6 while the position of minimum compression is shown in FIG. 3.

The diameter of the resilient ring 70, the material which comprises the resilient ring 70, and the included angle of disposition "C" of the inclined bottom surface 76 of the groove 68 each have an impact upon the magnitude of frictional engagement between the cutting bit and the resilient ring. A resilient ring 70 with a larger diameter typical results in a greater degree of frictional engagement with the hexagonal portion 36 of the cavity wall 32. A resilient ring 70 of a harder material typically results in a greater degree of frictional engagement with the hexagonal portion 36 of the cavity wall 32. A groove 68 with an inclined bottom surface 72 which has a greater included angle of disposition "C" typically results in a greater degree of frictional engagement with the hexagonal portion 36 of the cavity wall 32. These parameters are subject to variation so as to achieve the desired performance characteristics.

Referring to FIG. 4, because of the fact that the axially forward hexagonal portion 60 of the chuck 42 contains the groove 68 and the hexagonal portion 60 registers with the hexagonal portion 36 of the cavity wall 32 upon assembly of the cutting bit to the chuck, there exist six discrete points of contact (94a, 94b, 94c, 94d, 94e and 94f) between the resilient ring 70 and the surface of the hexagonal portion 36. The frictional resistance is due to the presence of these discrete points of contact.

The preferred embodiment of the cutting bit-chuck assembly comprises a modified Kennametal Inc. (Latrobe, Pa., U.S.A.) Model KWH-1 roof drill bit. The modification comprises the elimination of the side hole that receives a protrusion on the retainer clip. The bit has an overall length equal to 2.21 inches (56.26 mm) and an inside hexagonal dimension equal to 0.631 inches (16.03 mm) as measured from the mid-point of one flat surface of the hexagonal configuration to the mid-point of the opposite flat surface.

The chuck is a Kennametal Model 5419 chuck (see U.S. Pat. No. 5,400,861) which has been modified to include the present invention. The axially forward hexagonal portion has a dimension as measured from the mid-point of one flat surface of the hexagonal configuration to the mid-point of the opposite flat surface equal to 0.615 inches (15.62 mm).

The groove 68 has an axial length equal to 0.125 inches (3.18 mm), the angle of inclination of the bottom surface of the groove 68 equals 20 degrees, and each one of the rounded junctures (78, 80) of the groove 68 has a radius equal to 0.035 inches (0.89 mm). The diameter of the groove at its deepest point is equal to 0.498 inches (12.65 mm). The diameter of the groove at its shallowest point is equal to about 0.564 inches (14.32 mm).

The resilient ring 70 has a cross-sectional diameter equal to 0.070 inches (1.78 mm) and an outside diameter equal to 0.625 inches (15.88 mm). It is thus seen that there is an interference equal to between about 0.0035 inches (0.09 mm) and about 0.004 inches (0.10 mm) between the ring and the cavity wall when the ring rests in the deepest part of the groove and the chuck is received within the cavity of the cutting bit. This degree of interference equals about 5 percent of the cross-section of the ring so that the ring experiences about a 5 percent compression. The dimension of the ring in this condition is between about 0.066 inches (1.68 mm) and 0.0665 inches (1.69 mm).

It is also seen that the interference fit (or the frictional engagement) between the ring and the cavity wall increases to equal about 0.036 inches (0.91 mm) at the point where the ring rests in the shallowest part of the groove, which is the point where there is the greatest degree of interference between the ring and the cavity wall. This degree of interference equals about 52 percent of the cross-section of the ring so that the ring experiences about a 52 percent compression. The dimension of the ring in this condition is about 0.034 inches (0.086 mm).

Resilient ring 70 is made of a 70 Durometer BUNA N material. BUNA N is one in a range of synthetic products (BUNA SS) made by copolymerizing butadiene with 10 to 30 percent of another polymerizable substance such as styrene or acetonitrile. See Gardner's Chemical Synonyms and Trade Names, Tenth Edition, Ash et al. editors, Gower Publishing Limited, England (1994), pp. 137–138.

Figure 7:
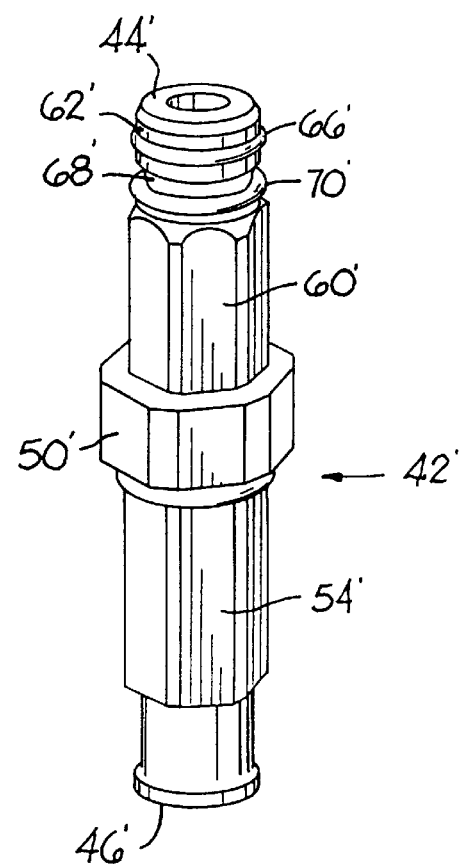
FIG. 7 is an isometric view of another specific embodiment of the chuck.
Figure 5:
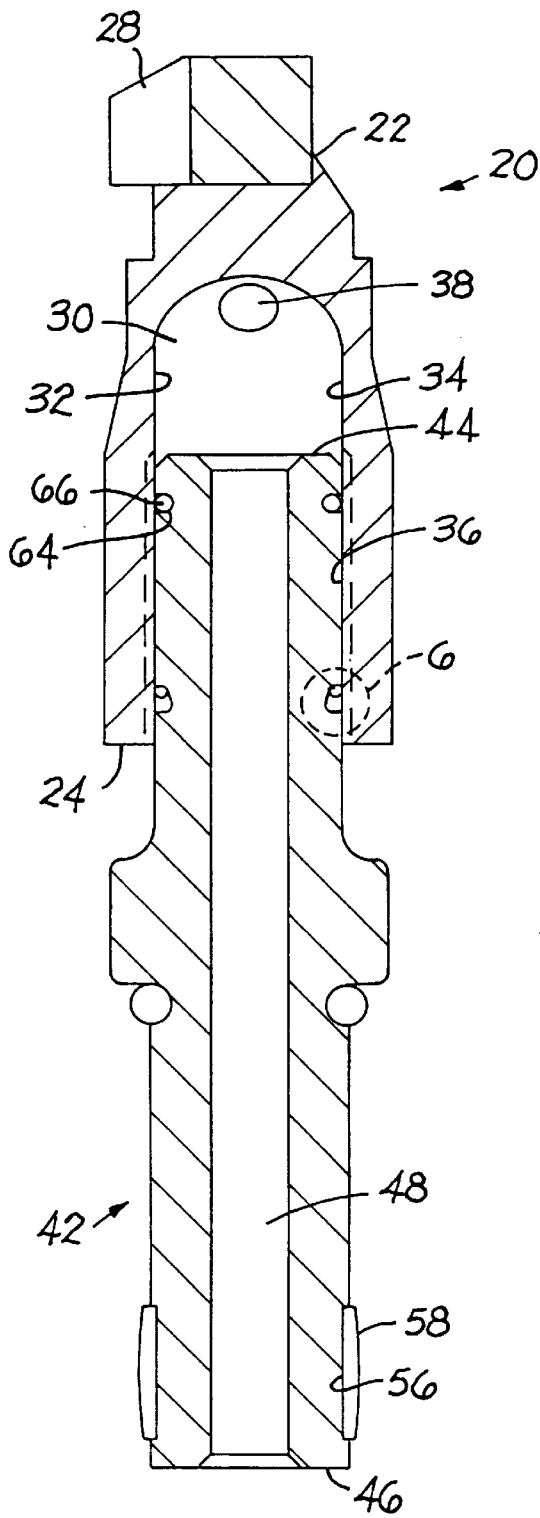
FIG. 5 is a cross-sectional view of the cutting bit and the chuck of FIG. 1 in an assembled condition wherein the cutting bit is in an axially forward portion relative to the chuck which is a common position of the cutting bit relative to the chuck during removal of the drill bit from the hole.

Referring to FIG. 7, there is another specific embodiment, of the chuck, generally designated as chuck 42'. Chuck 42' has a structure that is generally the same as that of chuck 42. The difference between the two embodiments of the chuck (42 and 42') is that the groove 68' that carries the resilient ring 70' which acts as the variable resistance retention member is in the axially forward cylindrical portion 62' of the chuck 42' rather than in the axially forward hexagonal portion of the chuck.

More specifically, chuck 42' includes an axially forward cylindrical portion 62' that contains two grooves (64' and 68'). The axially forwardmost groove 64' contains a resilient seal 66'. The second groove 68' contains resilient ring 70'. Groove 68' presents a structure like that of groove 68 in the first specific embodiment. The function of the resilient ring 70' is like that of resilient ring 70 except that the resilient ring 70' engages the cylindrical portion 34' of the cavity wall so that there is a continuous line of contact about the circumference of the resilient ring 70'.

Referring to FIG. 8, there is illustrated another specific embodiment of a chuck, generally designated as chuck 110. Chuck 110 has an axially forward end 112 and an axially rearward end 114. Chuck 42 further includes an axially forward cylindrical portion 116, and axially forward hexagonal portion 118, an enlarged hexagonal portion 120, and an axially rearward hexagonal portion 122.

The axially forward hexagonal portion 118 of the chuck 110 contains a groove 124 which has a configuration like the groove 68 in the first embodiment of the chuck. Groove 124 has an axially forward surface of a lesser depth and an axially rearward surface of a greater depth wherein these surfaces are joined together by an inclined bottom surface which moves radially outwardly as the groove moves from the axially rearward surface to the axially forward surface. A resilient ring 126 is contained in groove 124 and functions in a fashion like the resilient ring 70 carried in groove 68 of the chuck 42 so as to form a connection with a cutting bit.

Figure 9:
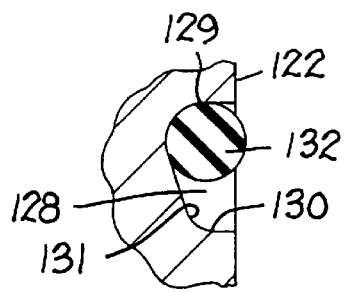
FIG. 9 is a cross-sectional view of a portion of the connector of FIG. 8 taken along section line 9—9 of FIG. 8.

Referring to FIGS. 8 and 9, the axially rearward hexagonal portion 122 of the chuck 110 contains a groove 128 which presents an axially forward surface 129 (of a greater depth) and an axially rearward surface 130 (of a lesser depth) joined together by an inclined bottom surface 131. The inclined bottom surface 131 moves radially inwardly as the groove 128 moves from the axially rearward surface 130 to the axially forward surface 129. Resilient ring 132 is carried in the groove 128. Like for the groove 68 of chuck 42, the angle of inclination of the groove 128 may vary between about 7 degrees and about 45 degrees depending upon the specific application, the size of the resilient ring 132, and the like. Resilient ring 132 functions to connect the chuck 110 a drill steel 134. Drill steel 134 has a hexagonal interior wall 136 that defines an opening 138 at the axially forward end 139 of the drill steel 134.

Referring to the use of chuck 110, chuck 110 connects at its axially forward end to a cutting bit like chuck 42 connects to cutting bit 20 so that the description of this connection and the function thereof is not necessary.

Chuck 110 connects at its axially rearward end to the drill steel 134 so that chuck 110 connects the cutting bit to the drill steel. The axially rearward hexagonal portion 122 of the chuck 110 is received within the opening 138 of the drill steel 134. During the receipt of the chuck 110 by the drill steel 134, as the drill steel moves axially forwardly relative to the chuck 110, the hexagonal wall 136 engages (i.e., frictionally engages) the resilient ring 132 so as to move the ring 132 toward the axially forward surface 129 of the groove 128 so that the ring 132 preferably, but not necessarily, abuts against axially forward surface 129. The operator will typically assemble the drill steel 134 on the chuck 110 so that the axially forward end 129 of the drill steel 134 abuts against a shoulder defined by the enlarged hexagonal portion 120 of the chuck 110. This is also the position of the drill steel 134 relative to the chuck 110 (i.e., the axially forward end 139 of the drill steel 134 remains in abutment against the shoulder) during the drilling operation since these members are under compression.

While in this position, the resilient ring 132 preferably rests in the rounded juncture between the inclined bottom surface and axially forward surface 129 of the groove 128. The resilient ring 132 does not exert much force against the hexagonal wall 136 of the drill steel 134 because it only slightly (or lightly) contacts the wall. In this regard, the diameter of the resilient ring 132 when in a relaxed condition is preferably slightly larger than the depth of the groove 128 adjacent to the axially forward surface 129 thereof. By having such a diameter, the ring 132 is in contact (even though it is slight) with the hexagonal wall 136 of the drill steel 134 when resting in the axially forward rounded juncture.

As previously mentioned, during the removal of the cutting bit-chuck-drill steel assembly from the hole the cutting bit will sometimes become stuck in the hole. When the cutting bit sticks in the hole, the continued movement of the drill steel may cause the drill steel to move away from (i.e., axially rearward relative to) the chuck 110. Because there is some (even though it may be slight) frictional engagement between the resilient ring 132 and the hexagonal wall 136, the axially rearward movement of the drill steel relative to the chuck 110 causes the ring 132 to move toward the axially rearward surface 130 of the groove 128. Because of the gradual decrease in the depth of the groove 128 due to the inclination of the bottom surface 131, the degree of compression between the hexagonal wall 136 of the drill steel 134 and the bottom surface 130 of the groove 128 becomes more severe as the resilient ring 132 moves closer to the axially rearward surface 130 of the groove 128. Although it is not illustrated, it can be appreciated that the resilient ring 132 deforms as it moves axially rearwardly so that it takes on a distorted shape much like the ring shown in FIG. 3.

Resilient ring 132 thus functions to provide for variable resistance between itself and the hexagonal wall 32 of the drill steel 134 so as to frictionally retain the drill steel 134 on the chuck 110. The degree of resistance varies between a maximum at the point where the resilient ring 132 abuts against the axially rearward surface 130 of the groove 128, and a minimum when the ring 132 rests in the rounded juncture of the groove 128.

Like for resilient ring 70, the diameter of the resilient ring 132, the material which comprises the resilient ring 132, and the included angle of disposition of the inclined bottom surface 131 of the groove 128 each have an impact upon the magnitude of frictional engagement between the drill steel and the resilient ring. These parameters are subject to variation so as to achieve the desired performance characteristics.

Referring to FIG. 10, there is illustrated a connector 140 which has an axially forward end 142 and an axially rearward end 144. Connector 140 has an axially forward hexagonal portion 146 and an axially rearward hexagonal portion 148. An enlarged hexagonal portion 150 separates the axially forward hexagonal portion 146 from the axially rearward hexagonal portion 148.

Axially forward hexagonal portion 146 contains a groove 152 therein wherein the groove 152 has a configuration like that of groove 68 in chuck 42. Groove 152 has an axially forward surface of a lesser depth and an axially rearward surface of a greater depth wherein these surfaces are joined together by an inclined bottom surface which moves radially outwardly as the groove moves from the axially rearward surface to the axially forward surface. A resilient ring 154 is contained in groove 152.

Axially rearward hexagonal portion 148 of the connector 140 contains a groove 156 therein wherein the groove 156 has a configuration like that of groove 128 in chuck 110. Groove 156 has an axially forward surface of a greater depth and an axially rearward surface of a lesser depth wherein these surfaces are joined together by an inclined bottom surface which moves radially inwardly as the groove 156 moves from the axially rearward surface to the axially forward surface. A resilient ring 158 is contained in groove 156.

FIG. 10 shows an axially forward drill steel 160 which has a hexagonal wall 162 that defines an opening 164 at the axially rearward end 165 thereof. There is also an axially rearward drill steel 168 which has a hexagonal wall 170 that defines an opening 172 at the axially forward end 173 thereof.

In use, connector 140 connects together the axially forward drill steel 160 and the axially rearward drill steel 168. The resilient ring 152 functions relative to the hexagonal wall 162 of drill steel 160 like ring 68 functions relative to cavity wall 32 of cutting bit 20 so that additional description is not necessary. The resilient ring 158 functions relative to the hexagonal wall 170 of drill steel 168 like ring 132 of chuck 110 functions relative to hexagonal wall 136 of drill steel 134 so that additional description is not necessary. The parameters that affect the function of rings 68 and 132 also affect the function of resilient rings 152 and 158.

Referring to FIG. 11, there is shown a drill steel 180 having an elongate body with an axially forward end 182 and an axially rearward end 184. Drill steel 180 is shown as broken along the length thereof. Although not illustrated, the rearward end 184 of drill steel 180 has a hexagonal opening defined by a hexagonal wall like that shown for an adjacent drill steel 180' wherein drill steel 180' has a rearward end 184' with an opening 186' defined by a hexagonal wall 188'.

Drill steel 180 has a connector 190 at the axially forward end 182 thereof. Connector 190 has an axially forward end 192 and an axially rearward end 194. Connector 190 has a hexagonal portion 196 which has a groove 198 therein that carries a resilient ring 200. The groove 198 is structurally like groove 68 in chuck 42 in that it has an axially forward surface of a lesser depth and an axially rearward surface of a greater depth joined by an inclined bottom surface.

In use, the connector 190 of drill steel 180 is received in the opening 186' of drill steel 180'. The resilient ring 200 frictionally engages the hexagonal wall 188' of drill steel 180' in a fashion similar to the way that resilient ring 68 engages the cavity wall 32 of the cutting bit so that additional description of the function of the resilient ring 200 relative to the drill steel 180' is not necessary.

FIG. 12 illustrates another embodiment of the chuck wherein chuck 210 has an axially forward end 212, an axially rearward end 214, an axially forward hexagonal portion 216, an axially forward cylindrical portion 217, and an axially rearward hexagonal portion 218. Axially forward portion 217 contains a groove 222 which is structurally similar to groove 68 in chuck 42. Groove 222 contains a resilient ring 224 which functions in a way like ring 70 does in groove 68 so as to provide for variable resistance retention between the chuck and a cutting bit (not illustrated), which is structurally like cutting bit 20. Resilient ring 224 also functions to provide a continuous fluid seal between the axially forward cylindrical portion 217 of the chuck 210 and the cavity wall of the cavity in the cutting bit. In this regard, the dimension of the resilient ring 224 must be sufficient so to sealing engage the cavity wall regardless of its position in the groove 222.

It should be appreciated that while the above specific embodiments which pertain to a cutting bit show the chuck as having the groove which carries the resilient ring wherein the chuck is received in a cavity in the cutting bit, this invention has application for the roof drill bits which do not have a cavity. More particularly, this invention also has application to roof drill bits which have a rearwardly extending shank (rather than a cavity) include, for example, the two-prong roof drill bit (e.g., Kennametal Model RD-1⅜) or the conventional roof drill bit (e.g., Kennametal Model FVM-1⅜). See "Kennametal Mining Products" Catalog A96-55(15)H6 at page 30.

The shank of these roof drill bits can have a groove which carries a resilient ring. The shank extends into the cavity of the drill steel so that the resilient ring engages the wall of the drill steel cavity and functions as the variable resistance retention member in that it provides for the frictional engagement between the ring and the cavity wall so as to retain the roof drill bit to the drill steel.

The patents and other documents identified herein are hereby incorporated by reference herein.

Other embodiments of the invention will be apparent to those skilled in the art from a consideration of the specification or practice of the invention disclosed herein. It is intended that the specification and examples be considered as illustrative only, with the true scope and spirit of the invention being indicated by the following claims.

What is claimed is:

1. A rotatable cutting bit assembly comprising:
a cutting bit having an axially forward end and an axially rearward end, at least one cutting insert at the axially forward end of the cutting bit;
a chuck having an axially forward end and an axially rearward end, and the chuck having a central longitudinal axis;
the cutting bit being attached to the axially forward end of the chuck, and upon assembling the bit and the chuck a variable resistance retention member being between the chuck and the cutting bit;
the chuck contains a groove, the variable resistance retention member is a resilient ring, and the groove carrying the resilient ring; and
the groove having a bottom surface that inclines radially outwardly relative to the central longitudinal axis of the chuck as the bottom surface moves toward the axially forward end of the chuck, and the groove further having an axially forward surface and an axially rearward surface.

2. The rotatable cutting bit assembly of claim 1 wherein the cutting bit containing a cavity therein; the cavity having an opening at the rearward end of the cutting bit, a cavity wall defining the cavity; the chuck has a cylindrical portion adjacent to the axially forward end thereof, and the chuck having a non-cylindrical portion axially rearwardly of the cylindrical portion; and the cavity wall of the cutting bit having a cylindrical portion adjacent the axially forward end of the cavity and a non-cylindrical portion axially rearwardly of the cylindrical portion of the cavity wall; and upon the assembly of the cutting bit to the chuck, the non-cylindrical portion of the cutting bit registering with the non-cylindrical portion of the chuck so as to form a driving connection there between and the cylindrical portions being adjacent to each other.

3. The rotatable cutting bit assembly of claim 2 wherein the chuck contains a groove in the non-cylindrical portion thereof, and the retention member comprising a resilient ring carried in the groove, and the groove having an axially forward surface, an axially rearward surface, and a bottom surface that is inclined radially outwardly relative to the central longitudinal axis of the chuck as the bottom surface moves toward the axially forward end of the chuck.

4. The rotatable cutting bit assembly of claim 3 wherein there are a plurality of discrete points of contact between the ring and the cavity wall.

5. The rotatable cutting bit assembly of claim 2 wherein the chuck contains a groove in the cylindrical portion thereof, and the retention member comprising a resilient ring carried in the groove, and the groove having an axially forward surface, an axially rearward surface, and a bottom surface that is inclined radially outwardly relative to the central longitudinal axis of the chuck as the bottom surface moves toward the axially forward end of the chuck.

6. The rotatable cutting bit of claim 5 wherein there is a continuous line of contact between the ring and the cavity wall.

7. The rotatable cutting bit assembly of claim 1 wherein the resilient ring has a diameter that is greater than the depth of the groove adjacent the axially rearward surface thereof.

8. The rotatable cutting bit assembly of claim 1 wherein the resilient ring provides a fluid-tight seal between the chuck and the cutting bit.

9. The rotatable cutting bit assembly of claim 1 wherein the depth of the groove is greatest adjacent the axially rearward surface thereof, and the resilient ring having a diameter such that when the ring is adjacent to the axially rearward surface of the groove the ring extends out of the groove to such an extent so that upon assembling the bit and the chuck the ring engages the bit.

10. The rotatable cutting bit assembly of claim 1 wherein the chuck includes a stop shoulder which limits the extent to which the chuck extends into the cavity of the cutting bit upon assembling the cutting bit and the chuck due to impingement of the cutting bit against the stop shoulder.

11. The rotatable cutting bit assembly of claim 10 wherein the resilient ring is adjacent to the axially rearward surface of the groove when the cutting bit impinges against the stop shoulder on the chuck.

12. The rotatable cutting bit assembly of claim 11 wherein the cutting bit containing a cavity therein; the cavity having an opening at the rearward end of the cutting bit, a cavity wall defining the cavity; upon the movement of the cutting bit axially forwardly of the stop shoulder, the cavity wall of the cutting bit engages the resilient ring so as to move the resilient ring axially forwardly in the groove toward the axially forward surface of the groove thereby compressing the resilient ring between the bottom surface of the groove and the cavity wall so that the frictional resistance between the ring and the cavity wall increases as the compression of the ring becomes greater.

13. The rotatable cutting bit assembly of claim 12 wherein the degree of frictional resistance is at a maximum when the resilient ring abuts the axially forward surface of the groove.

14. The rotatable cutting bit assembly of claim 12 wherein the degree of frictional resistance is at a minimum when the resilient ring abuts against the axially rearward surface of the groove.

15. The rotatable cutting bit assembly of claim 1 wherein the resilient ring is in its state of minimum compression when the ring abuts the axially rearward surface of the groove and is not in contact with the axially forward surface of the groove.

16. The rotatable cutting bit assembly of claim 15 wherein the resilient ring is in its state of maximum compression when the ring abuts the axially forward surface of the groove and is not in contact with the axially rearward surface of the groove.

17. A chuck for assembly to a member wherein the member has a cavity defined by a cavity wall, the chuck comprising:

an elongate body having an axially forward end and an axially rearward end, the elongate body having a central longitudinal axis;

the elongate body carrying a variable resistance retention member;

upon assembling the chuck and the member, the variable resistance retention member frictionally engaging the cavity wall of the member so as to retain the member on the elongate body;

the elongate body contains a groove that carries the variable resistance retention member; the groove has an axially forward surface, an axially rearward surface, and a bottom surface; the bottom surface is inclined radially outwardly relative to the central longitudinal axis of the elongate body as the bottom surface moves toward a selected one of the axial ends of the elongate body; and the retention member is a resilient ring.

18. The chuck of claim 17 wherein the degree of frictional engagement between the resilient ring and the cavity wall is at a maximum when the resilient ring abuts the axially forward surface of the groove, and the degree of frictional resistance between the resilient ring and the cavity wall is at a minimum when the resilient ring abuts against the axially rearward surface of the groove.

19. The chuck of claim 17 wherein upon assembling the elongate body and the member there is a driving connection therebetween.

20. The chuck of claim 17 wherein the elongate body further includes an axially forward portion adjacent to the axially forward end, and an axially rearward portion adjacent to the axially rearward end.

21. The chuck of claim 17 further comprising a second resilient ring, and the axially forward portion of the elongate body containing a groove which carries the second resilient ring.

22. The rotatable cutting bit assembly of claim 17 wherein the resilient ring is in its state of minimum compression when the ring abuts the axially rearward surface of the groove and is not in contact with the axially forward surface of the groove.

23. The rotatable cutting bit assembly of claim 22 wherein the resilient ring is in its state of maximum compression when the ring abuts the axially forward surface of the groove and is not in contact with the axially rearward surface of the groove.

24. A drill steel for connection to a member with a cavity defined by a cavity wall, the drill steel comprising:

an elongate body having opposite ends, the elongate body has a connector at one of the opposite ends thereof, and the connector having a groove wherein the groove has an axially forward surface, an axially rearward surface and a bottom surface, and the bottom surface inclines radially outwardly as it moves toward the axially forward surface;

the drill steel carrying a variable resistance retention member wherein the variable resistance retention member comprising a resilient ring, and the groove carrying the resilient ring therein; and upon assembling the drill steel and the member, the resilient ring frictionally engaging the cavity wall of the member so as to retain the member on the drill steel.

25. The drill steel of claim 24 wherein the elongate body contains a cavity at an other one of the opposite ends thereof.

26. The drill steel of claim 24 wherein the resilient ring is in its state of minimum compression when the ring abuts the axially rearward surface of the groove and is not in contact with the axially forward surface of the groove.

27. The drill steel of claim 26 wherein the resilient ring is in its state of maximum compression when the ring abuts the axially forward surface of the groove and is not in contact with the axially rearward surface of the groove.

28. An assembly of rotatable members comprising:

a first member having opposite ends and containing a cavity therein;

a second member having opposite ends and a central longitudinal axis;

upon assembling the first member and the second member, one of the ends of the second member being received in the cavity of the first member, and a variable resistance retention member being between the first member and the second member;

the second member contains a groove with an axially forward end and an axially rearward end, the variable resistance retention member being a resilient ring, and the groove carrying the resilient ring; and the groove presenting a bottom surface that inclines radially outwardly relative to the central longitudinal axis of the second member as the bottom surface moves toward a selected one of the axially forward and rearward ends of the groove so that as the resilient ring moves away from being in contact with the other one of the ends of the groove the resilient ring becomes more compressed.

29. The cutting bit assembly of claim 28 wherein the selected one of the ends is the axially forward end of the groove and the other of the ends is the axially rearward end of the groove.

30. The cutting bit assembly of claim 28 wherein the resilient ring is in its state of minimum compression when the ring abuts the axially rearward surface of the groove and is not in contact with the axially forward surface of the groove.

31. The cutting bit assembly of claim 30 wherein the resilient ring is in its state of maximum compression when the ring abuts the axially forward surface of the groove and is not in contact with the axially rearward surface of the groove.

* * * * *